(12) United States Patent
Suzuki et al.

(10) Patent No.: US 7,440,478 B2
(45) Date of Patent: Oct. 21, 2008

(54) LASER BEAM PATH LENGTH DIFFERENCE DETECTOR, LASER PHASE CONTROLLER, AND COHERENT OPTICAL COUPLER

(75) Inventors: Jiro Suzuki, Tokyo (JP); Yoshihito Hirano, Tokyo (JP); Yutaka Ezaki, Tokyo (JP); Yasushi Horiuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 11/631,308

(22) PCT Filed: Sep. 13, 2004

(86) PCT No.: PCT/JP2004/013325

§ 371 (c)(1),
(2), (4) Date: Jan. 3, 2007

(87) PCT Pub. No.: WO2006/030482

PCT Pub. Date: Mar. 23, 2006

(65) Prior Publication Data

US 2008/0031292 A1 Feb. 7, 2008

(51) Int. Cl.
*H01S 3/10* (2006.01)
(52) U.S. Cl. ................ 372/25; 372/29.014; 372/29.016
(58) Field of Classification Search .................... 372/25, 372/29.016
See application file for complete search history.

(56) References Cited

U.S. PATENT DOCUMENTS 4,048,585 A * 9/1977 Murasawa .................... 372/20
4,744,659 A   5/1988 Kitabayashi
6,219,360 B1  4/2001 Komine
6,366,356 B1  4/2002 Brosnan et al.
2002/0118371 A1* 8/2002 Jiang et al. ................. 356/517
2003/0112451 A1* 6/2003 Mautz ........................ 356/630

FOREIGN PATENT DOCUMENTS

| JP | 61-230002 A  | 10/1986 |
| JP | 6-160117 A   | 6/1994  |
| JP | 11-340555 A  | 12/1999 |
| JP | 2000-56280 A | 2/2000  |
| JP | 2000-323774 A| 11/2000 |
| JP | 2001-272332 A| 10/2001 |
| JP | 2003-75260 A | 3/2003  |

* cited by examiner

*Primary Examiner*—Dung T Nguyen
(74) *Attorney, Agent, or Firm*—Birch, Stewart, Kolasch & Birch, LLP

(57) ABSTRACT

Provided are a small-sized, low-cost, and easy-to-use laser optical path length difference detecting device, a laser optical path length difference detecting device, and a coherent optical coupling device. The laser optical path length difference detecting device detects an optical path length difference between propagation paths of a first laser beam (1) and a second laser beam (2), which are mutually coherent when the beams are propagated through two arbitrary optical paths of a plurality of laser beam optical paths. The laser optical path length difference detecting device is provided with an optical path length difference variable means (4) for changing the optical path length difference between the first laser beam (1) and the second laser beam (2), a wavefront inclination generating means (5) for inclining a wavefront of at least one of the first laser beam (1) and the second laser beam (2), and a two-dimensional detector (6) for detecting the interference light intensity distribution of the first laser beam (1) and the second laser beam (2) which have passed through the wavefront inclination generating means.

9 Claims, 7 Drawing Sheets

LASER BEAM PATH LENGTH DIFFERENCE DETECTOR, LASER PHASE CONTROLLER, AND COHERENT OPTICAL COUPLER

TECHNICAL FIELD

The present invention relates to a laser device, and more particularly, to a light measurement technology and a light control technology in entire devices for controlling plural laser beams that are mutually coherent.

BACKGROUND ART

There has been generally known a system of condensing plural laser beams on a target at the same time to obtain a desired light intensity in a laser device required to output a significant power. In the laser device of such the type, in order to concentrate energy onto a fine target at a long distance, there has been studied such a technology that a laser beam that is produced by one main oscillator is split in plural laser beams, and then amplified individually, and the plural laser beams that have been amplified are so arranged as to bundle together (hereinafter, the plural laser beams that have been bundled together are called "main power beam") to obtain a convergence performance that is equivalent to a single laser beam having a large diameter. Herein, such the technology is called "coherent coupling". The prior art of a device that realizes the coherent coupling is disclosed in, for example, Patent Document 1.

In order to conduct the coherent coupling, it is necessary to control the phases of the respective laser beams so that the equivalent phase planes of the electromagnetic waves of the plural laser beams that constitute the main power beam are regarded as one wavefront. In such the control, there is required a phase out-of-synchronization detecting device that detects a relative phase difference of the plural laser beam. Patent Document 1 discloses a method in which a part of light is split, by means of a beam splitter, from the main oscillator which is a source of the plural laser beams as a reference light, and is interfered with the main power beam to detect a phase difference from the interference intensity.

Patent Document 1: JP 11-340555A (FIG. 5)

DISCLOSURE OF THE INVENTION

Problem to be solved by the Invention

Because the conventional phase out-of-synchronization detecting device is configured as described above, it is necessary that the main power beam, the phase difference of which is to be detected, interferes with the reference light. However, in the case where the main power beam is an ultrashort pulse laser that is shorter in the coherent length, for example, the pulse width is equal to or lower than pico second, the pulse of the reference light does not coincide with the main power beam in the optical path length of the propagation path. In the case where there is an optical path length difference, there arises a problem in that the relative phase difference cannot be detected when the optical path length difference exceeds a constant value because the reference light does not interfere with the main power beam.

Also, to solve the above-mentioned problem, a laser optical path length difference detecting device for conducting detection with a dynamic range and precision as the occasion demands is required in order to make the reference light coincide with the main power beam in the optical path length difference of the propagation path, and an expensive and delicate measuring device such as a laser length measurement machine has been required.

The present invention has been made to solve the above-mentioned problem, and therefore an object of the present invention is to provide a laser optical path length difference detecting device that is small in the size, low in the costs, and is easy to use, a laser phase control device for a coherent optical coupling device using the laser optical path length difference detecting device, and a coherent optical coupling device using the laser phase control device.

Means for solving the Problems

A laser optical path length difference detecting device according to the present invention detects an optical path length difference between propagation paths of a first laser beam and a second laser beam which are mutually coherent when the first and second laser beams are propagated through two arbitrary optical paths of a plurality of laser beam optical paths, and includes: optical path length difference variable means for changing an optical path length difference between the first laser beam and the second laser beam; wavefront inclination generating means for inclining a wavefront of at least one of the first laser beam and the second laser beam; and optical intensity distribution detecting means for detecting an interference light intensity distribution of the first laser beam and the second laser beam which have passed through the wavefront inclination generating means.

Further, a laser phase control device according to the present invention outputs a feedback control signal to a phase delay variable section on the basis of the detection of a phase difference and an optical path length difference between a plurality of laser beams which are subjected to coherent optical coupling with each other through the phase delay variable section for changing the relative phase difference of the plurality of laser beams to control the phase difference and the optical path length difference between the plurality of laser beams, and is characterized by including the laser optical path length difference detecting device according to the above-mentioned invention to detect the optical path length difference between the plurality of laser beams.

Further, a coherent optical coupling device according to the present invention includes: a laser source for outputting a laser beam; a distributor section for distributing the laser beam that is outputted from the laser source to a plurality of laser beams; a phase delay variable section for controlling a relative phase of the laser beams that are distributed by the distributor section; an amplifier section for amplifying intensities of the plurality of laser beams that pass through the phase delay variable section; a synthesizer section for performing coherent optical coupling on the plurality of laser beams that are amplified by the amplifier section; and a laser phase control device for outputting a feedback control signal to the phase delay variable section to control a phase difference between the plurality of laser beams, to arbitrarily control a spatial intensity distribution of the laser beams that are subjected to coherent optical coupling by the synthesizer section, and is characterized in that the laser phase control device includes the laser phase control device according to claim 8, and outputs the feedback control signal to the phase delay variable section on the basis of the detection of the phase difference and the optical path length difference between the plurality of laser beams which are subjected to coherent optical coupling with each other by the synthesizer section to control the phase difference between the plurality of laser beams.

Effects of the Invention

According to the present invention, there can be obtained the laser optical path length difference detecting device that is easy and inexpensive in the configuration, and there can be obtained the laser phase control device that is capable of conducting desired phase control even in the case where an initial difference of the optical path length difference is large, and the coherent optical coupling device using the laser phase control device.

BEST MODES FOR CARRYING OUT THE INVENTION

Hereinafter, a description will be given of the best modes for carrying out the invention with reference to the accompanying drawings in order to describe the invention in more detail.

First Embodiment

Figure 1:
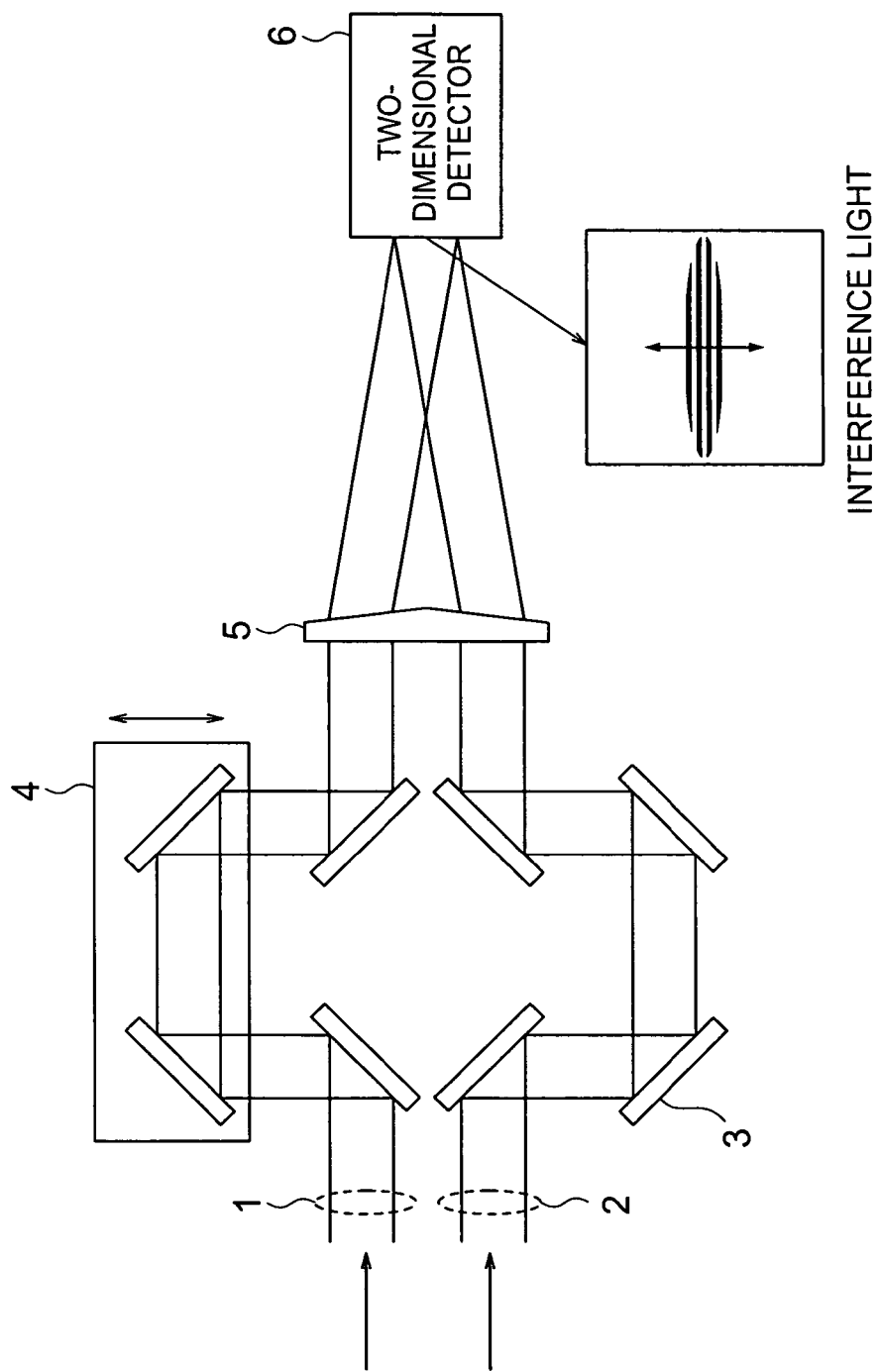
FIG. 1 is a structural diagram showing a laser optical path length difference detecting device according to a first embodiment of the present invention.

FIG. 1 is a structural diagram showing a laser optical path length difference detecting device according to a first embodiment of the present invention. A first laser beam 1 and a second laser beam 2 shown in FIG. 1 are obtained by splitting one pulse laser beam (not shown) which intermittently repeats oscillation, or a single-shot pulse laser beam into two laser beams in amplitude, subsequently propagating those two laser beams through two arbitrary optical paths of plural laser beam optical paths to be measured (not shown), and further enlarging or reducing the beam diameter as the occasion demands to guide the laser beams in parallel.

The optical paths of the first laser beam 1 and the second laser beam 2 are bent in directions shown through a mirror 3. Then, the optical path length by which the first laser beam 1 is propagated is changed through optical path length variable means 4. FIG. 1 shows a case in which the optical path length variable means 4 is made up of a position variable retro reflector. In addition, the first laser beam 1 and the second laser beam 2 produce a given angular difference in the advancing direction of the wavefronts due to wavefront inclination generating means 5 that is formed by a wedge prism, and the two wavefronts are spatially superimposed on each other at an arbitrary distance, to thereby produce an interference light. The spatial distribution of the intensity of the interference light is detected by a two-dimensional detector 6 that acts as optical intensity distribution detecting means, and then converted into an electric signal. The two-dimensional detector 6 is disposed at a position where the two-dimensional detector 6 is capable of detecting the interference light intensity of the first laser beam 1 and the second laser beam 2.

Figure 2:
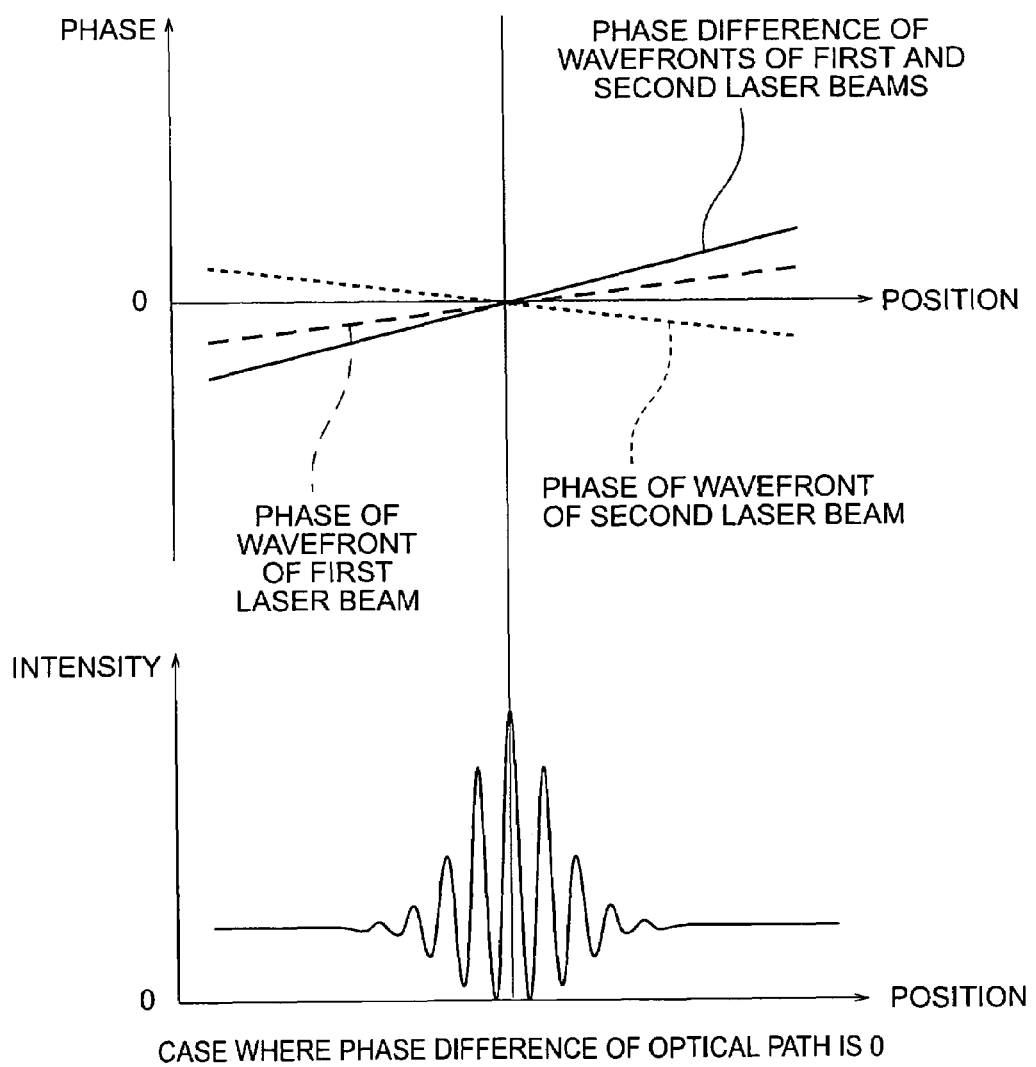
FIG. 2 is a diagram showing the phases and the interference intensities of wavefronts of a first laser beam 1 and a second laser beam 2 on a photo detection plane of a two-dimensional detector 6 shown in FIG. 1.

Subsequently, a description will be given of a method of detecting an optical path length difference between the propagation paths along which the first laser beam 1 and the second laser beam 2 are propagated according to the interference light intensity that is detected by the two-dimensional detector 6. FIG. 2 is an explanatory diagram showing the phases and the interface intensities of the wavefronts of the first laser beam 1 and the second laser beam 2 on the optical detection plane of the two-dimensional detector 6. As shown in FIG. 2, the phase difference between the first laser beam 1 and the second laser beam 2 linearly changes depending on the position. In this example, the interference light intensity in the interference of those two optical beams is represented by Expression (1).

$$I = a1^2 + a2^2 + 2 \cdot a1 \cdot a2 \cdot \cos(\theta 1 - \theta 2) \quad (1)$$

where I is an interference light intensity,
a1 is the amplitude of the first laser beam 1,
a2 is the amplitude of the second laser beam 2,
θ1 is the phase of the first laser beam 1, and
θ2 is the phase of the second laser beam 2.

The interference light intensity changes in a sinusoidal fashion with respect to a phase difference (θ1−θ2) from Expression (1). As described above, the phase difference of the wavefronts of the first laser beam 1 and the second laser beam 2 linearly changes on the optical detection plane of the two-dimensional detector 6 with respect to the position. Therefore, the interference intensity also changes in a sinusoidal fashion according to the position. In addition, since the first laser beam 1 and the second laser beam 2 are pulse lasers, no interference occurs when the phase difference (θ1−θ2) exceeds a given value. Therefore, as shown in FIG. 2, the interference light intensity appears only in a limited range centering on a position (hereinafter, referred to as main maximum) corresponding to the phase difference 0.

Figure 3:
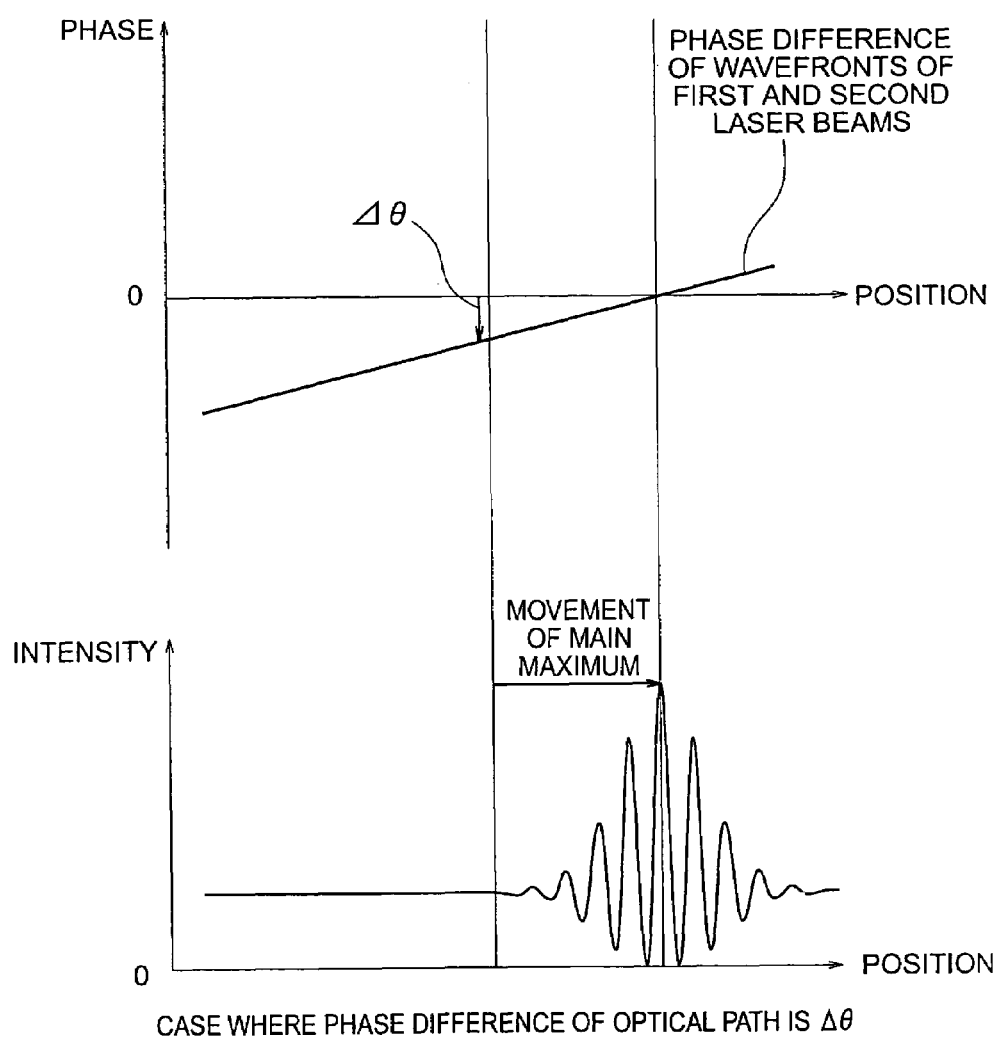
FIG. 3 is an explanatory diagram showing an interference intensity which is detected by a two-dimensional detector 6 when there is a phase difference Δθ of the optical path in correspondence with FIG. 2.

In this example, it is assumed that the optical path length difference exists between the respective propagation paths along which the first laser beam 1 and the second laser beam 2 are propagated. It is assumed that an additional phase difference which is caused by the optical path length difference is Δθ. FIG. 3 is an explanatory diagram showing the interference intensity that is detected by the two-dimensional detector 6 when there is the phase difference Δθ of the optical path. As shown in FIG. 3, a position at which the phase difference between the first laser beam 1 and the second laser beam 2 becomes 0, that is, a position of the main maximum which is the center of the interference fringes is displaced due to the phase difference Δθ of the optical path. Therefore, the amount of movement of the position of the main maximum is detected, thereby making it possible to know the phase difference Δθ of the optical path. Since the phase difference Δθ of the optical path reflects the optical path length difference between the propagation paths of the first laser beam 1 and the second laser beam 2, the phase is converted into the optical path length, thereby making it possible to obtain the optical path length difference of the propagation path.

When the optical path length difference of the propagation paths of the two laser beams to be detected becomes equal to or higher than the given value, the main maximum of the interference fringes is produced out of the detection range of the two-dimensional detector 6, as a result of which the phase difference Δθ cannot be detected. In order to compensate the above drawback, the optical path length variable means 4 is used to change the optical path length difference of the propagation path of the first laser beam 1. In a case where it is not known whether the optical path length difference increases or decreases, the optical path length difference is scanned with the two-dimensional detector 6 until the two-dimensional detector 6 detects the main maximum.

The above description is given of the method of detecting the optical path length difference between the propagation paths along which the arbitrary two laser beams are propagated. Similarly, it is possible to simply detect the optical path length difference of the propagation paths of three or more laser beams. In other words, the optical length differences between the propagation paths of one arbitrary laser beam and all the remaining laser beams can be detected by using the required number of devices described above, respectively.

Therefore, since the laser optical path length difference detecting device according to the first embodiment is configured as described above, advantages described below are obtained as compared with the conventional laser path length difference detecting device.

First, since the optical path length difference between the first laser beam 1 and the second laser beam 2 can be detected in a range in which the two-dimensional detector 6 is capable of detecting the movement of the main maximum, it is possible to realize the wide dynamic range.

Second, in the case where the main maximum is formed outside the detection range of the two-dimensional detector 6, the optical path length must be scanned with the optical path length variable means 4. However, the scanning of the optical path length may not be continuous, and scanning can be conducted at intervals as large as the phase difference by which the two-dimensional detector 6 is capable of detecting the main maximum. Accordingly, it is possible to reduce a period of time required to scan the optical path length.

Third, the simple optical system and the inexpensive two-dimensional detector 6 are used, which makes it possible to reduce the costs.

Fourth, the wedge prism is used as the wavefront inclination generating means, which makes it possible to extremely suppress the wavefront inclination change which is caused by the temperature change, thereby allowing stable measurement over a long period of time.

Second Embodiment

Figure 4:
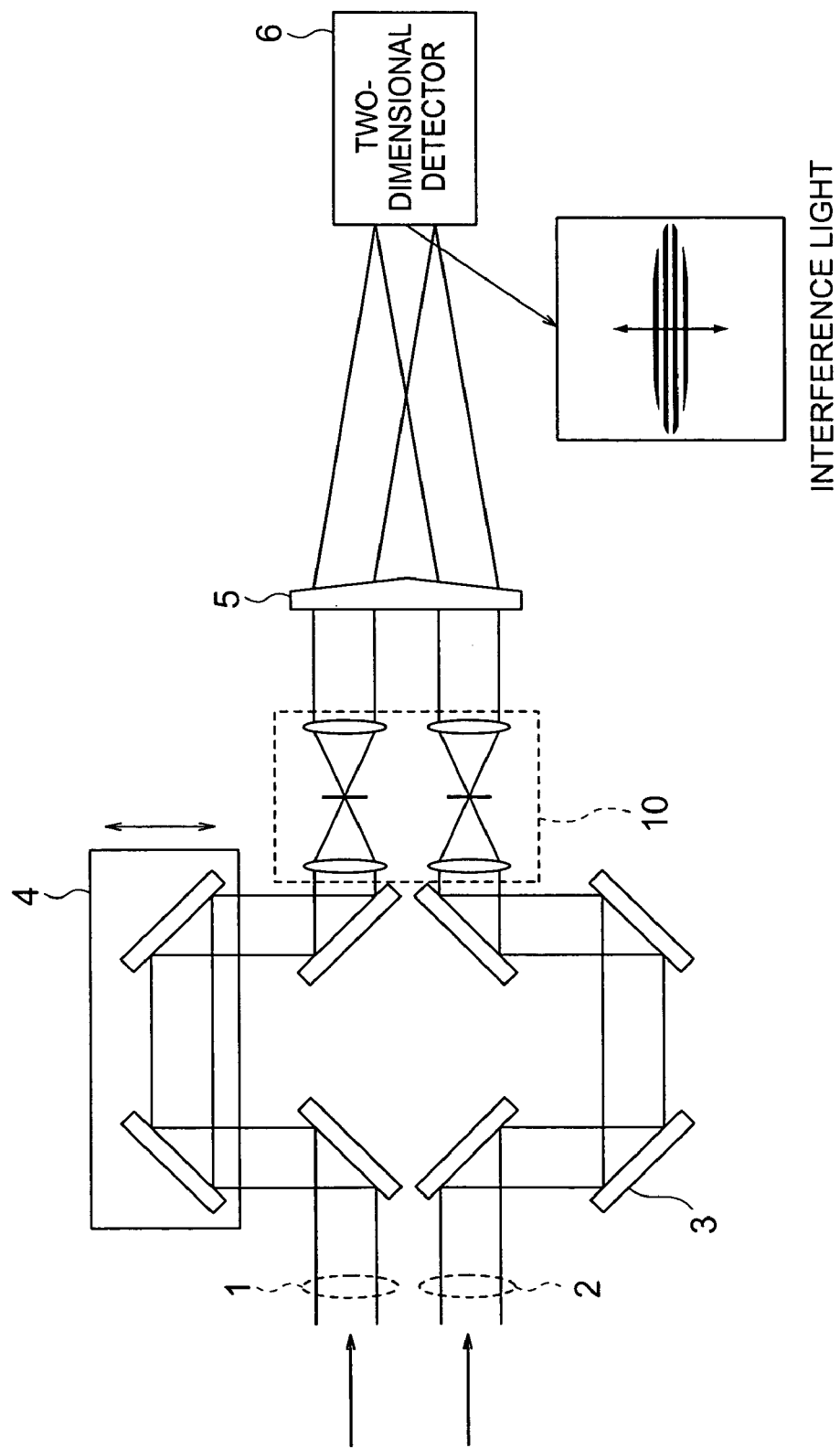
FIG. 4 is a structural diagram showing a laser optical path length difference detecting device according to a second embodiment of the present invention.

FIG. 4 is a structural diagram showing a laser optical path length difference detecting device according to a second embodiment of the present invention. In the second embodiment shown in FIG. 4, the same parts as those described in the first embodiment shown in FIG. 1 are designated by identical symbols, and their description will be omitted. In the second embodiment shown in FIG. 4, there is further provided a spatial filter 10 that is disposed in front of the wavefront inclination generating means 5 and removes the wavefront distortions of the respective wavefronts of the first laser beam 1 and the second laser beam 2 with respect to the configuration of the first embodiment shown in FIG. 1.

According to the laser optical path length difference detecting device of the second embodiment, since the spatial filter 10 is further provided, even if the wavefront distortions occur in the first laser beam 1 and the second laser beam 2, the wavefront distortion components can be removed, thereby making it possible to conduct stable measurement over a long period of time.

Third Embodiment

Figure 5:
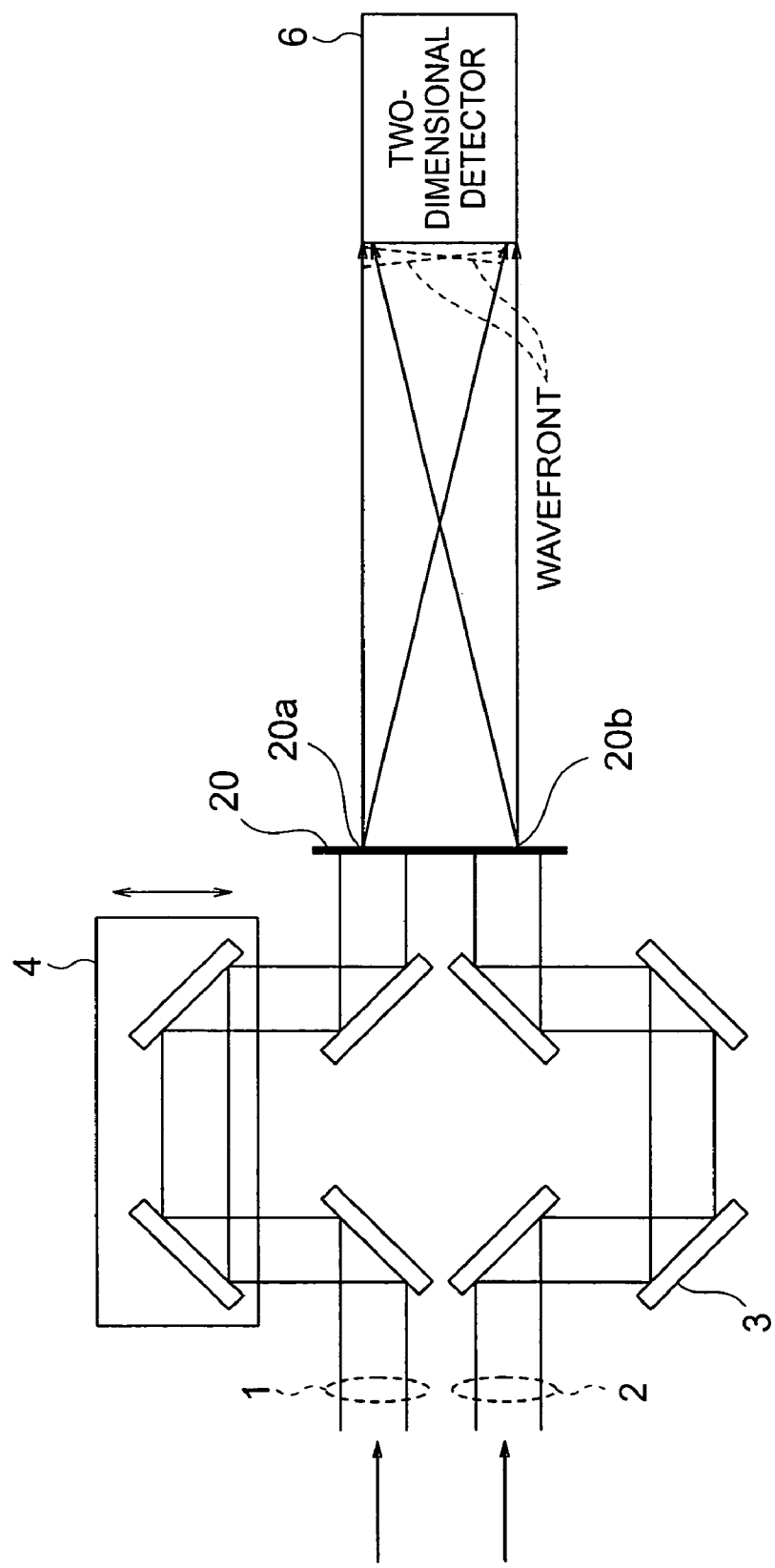
FIG. 5 is a structural diagram showing a laser optical path length difference detecting device according to a third embodiment of the present invention.

FIG. 5 is a structural diagram showing a laser optical path length difference detecting device according to a third embodiment of the present invention. In the third embodiment shown in FIG. 5, the same parts as those described in the first embodiment shown in FIG. 1 are designated by identical symbols, and their description will be omitted. In the third embodiment shown in FIG. 5, a shielding plate 20 having a first pin hole 20a and a second pin hole 20b is used instead of the wedge prism as the wavefront inclination generating means with respect to the configuration of the first embodiment shown in FIG. 1.

The first pin hole 20a and the second pin hole 20b act as the wavefront inclination generating means, and two small holes are defined in the shielding plate that is an opaque thin plate, and parts of the first laser beam 1 and the second laser beam 2 are so arranged as to pass through the respective different first pin hole 20a and second pin hole 20b. The wavefronts of the laser beams that have passed through the first pin hole 20a and the second pin hole 20b are converted into spherical waves centering on the small holes due to the diffraction phenomenon, and are superimposed on the two-dimensional detector 6 to produce the interference fringes. The interference of the diffraction light due to the two small holes has been generally known as the Young's experiment for interference.

Strictly speaking, since the interference is caused by the spherical wavefront having two finite curvatures, the intervals of the interference fringes are not equal to each other. However, as known from the Young's experiment for interference, a part of the spherical wavefront can approximate the inclined wavefront, so it is possible to detect the optical path length difference of the propagation paths of the two laser beams as in the first and second embodiments by slightly changing the signal processing method.

Therefore, the laser optical path length difference detecting device according to the third embodiment produces effects described below as compared with the conventional laser path length difference detecting device.

First, even if the first laser beam 1 and the second laser beam 2 have the wavefront distortion, since the wavefront distortion component can be removed by using the pin holes 20a and 20b as the wavefront inclination generating means, it is possible to conduct stable measurement for a long period of time.

Second, since it is unnecessary to use a lens or a prism by using the pin holes 20a and 20b, it is possible to reduce the costs.

In the third embodiment, the wavefront inclination generating means is made up of the pin holes 20a and 20b. However, the pin holes may be replaced with double slits composed of a first slit and a second slit with the same effects.

Fourth Embodiment

Figure 6:
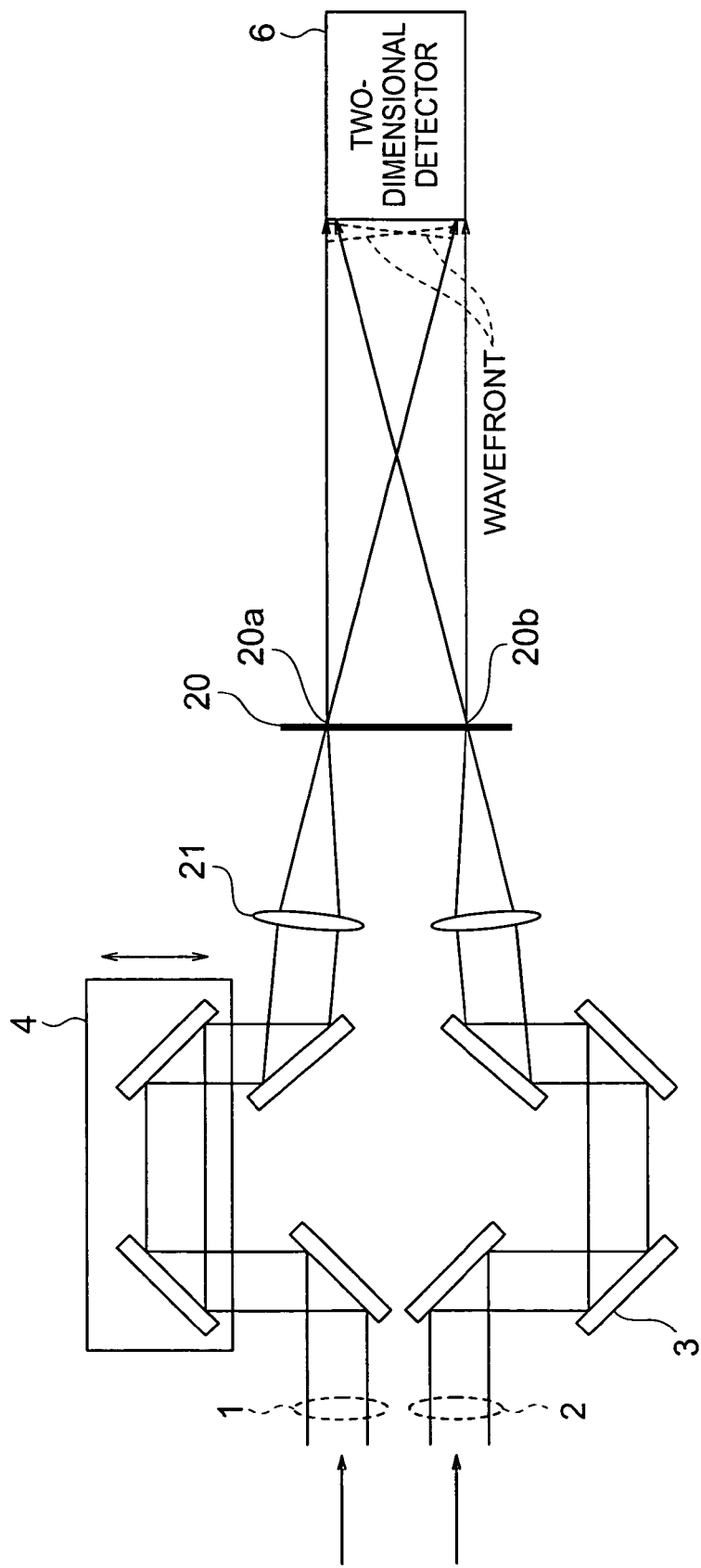
FIG. 6 is a structural diagram showing a laser optical path length difference detecting device according to a fourth embodiment of the present invention.

In the above-mentioned third embodiment, since the pin holes 20a and 20b discard most of the energies of the incident two laser beams, the use efficiency of light is low. In the fourth embodiment, a description will be given of a method of improving the use efficiency of light in the third embodiment. FIG. 6 is a structural diagram showing a laser optical path length difference detecting device according to a fourth embodiment of the present invention. In the fourth embodiment shown in FIG. 6, the same parts as those in the third embodiment shown in FIG. 5 are denoted by identical symbols, and their description will be omitted. The fourth embodiment shown in FIG. 6 further includes a condenser lens 21 that condenses the first laser beam 1 and the second laser beam 2 onto the first pin hole 20a and the second pin hole 20b, respectively with respect to the configuration of the third embodiment shown in FIG. 5.

The condenser lens 21 is formed of a transmission lens that condenses light onto one point and disposed at the laser incident side of the pin holes 20a and 20b. The condenser lens 21 is so disposed as to be condensed onto the small holes of the pin holes 20a and 20b, respectively.

Therefore, according to the laser optical path length difference detecting device of the fourth embodiment, since the condenser lens 21 is capable of condensing most of the energy of the laser beams onto the pin holes, the use efficiency of light can be enhanced as compared with the conventional laser path length difference detecting device.

The fourth embodiment shows an example in which the first laser beam 1 and the second laser beam 2 are condensed onto the first pin hole 20a and the second pin hole 20b, respectively. Likewise, the fourth embodiment can be implemented in the case of using the double slits consisting of the first slit and the second slit, and the same effects as those in the fourth embodiment are obtained.

Fifth Embodiment

A fifth embodiment shows an example in which the laser optical path length difference detecting devices according to the first to fourth embodiments are applied to the laser phase control device in the optical coherent coupling device.

Figure 7:
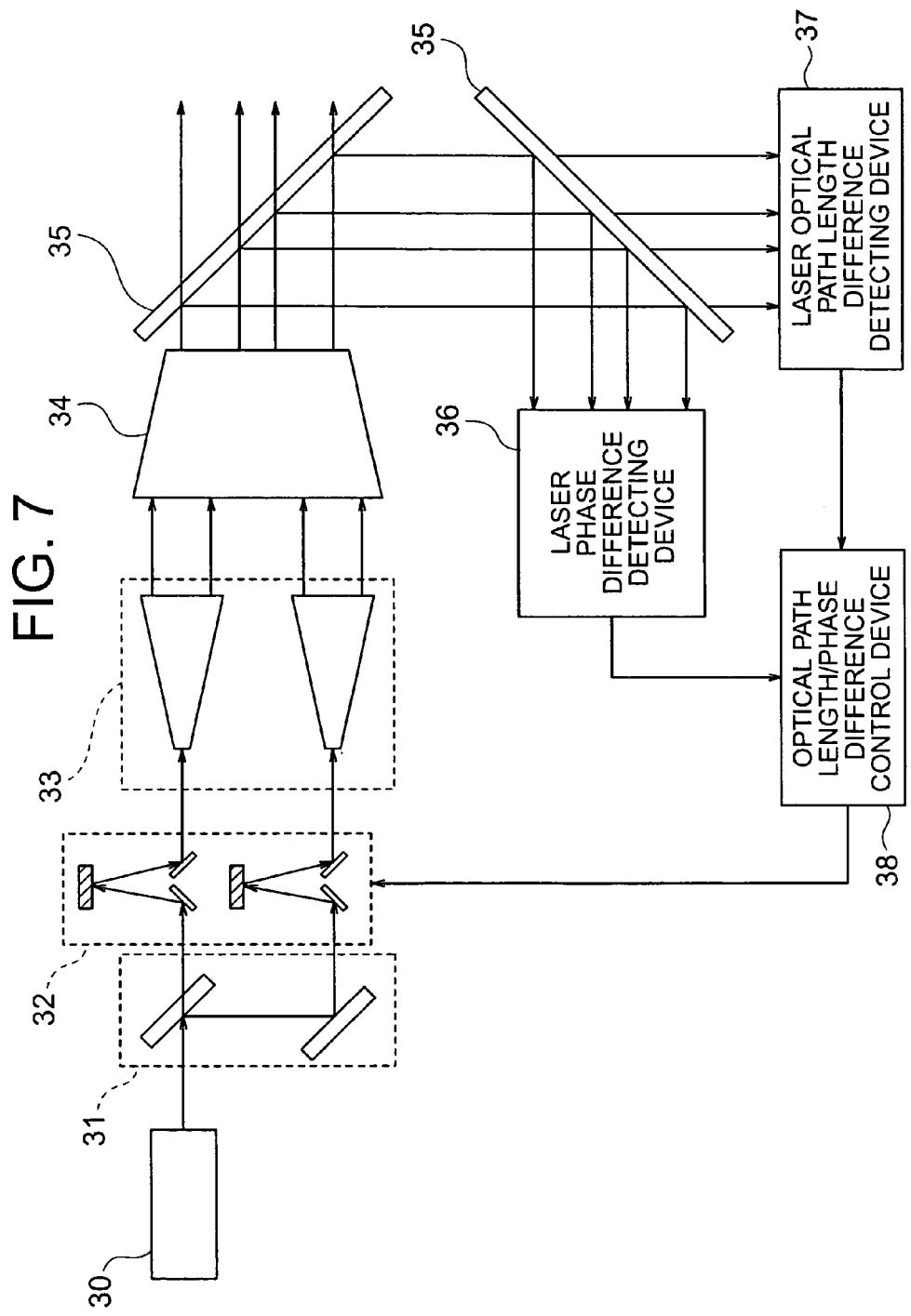
FIG. 7 is a structural diagram showing an optical coherent coupling device to which a laser phase control device according to a fifth embodiment of the present invention is applied.

FIG. 7 is a structural diagram showing an optical coherent coupling device to which a laser phase control device according to a fifth embodiment of the present invention is applied.

The optical coherent coupling device according to the fifth embodiment shown in FIG. 7 includes a laser source 30 that intermittently oscillates pulses, a distributor section 31 made up of plural beam splitters which distributes one laser beam produced by the laser source 30 into plural laser beams that are mutually coherent and outputs the laser beams, a phase delay variable device 32 that changes a relative phase difference of the plural laser beams to be subjected to coherent optical coupling, an amplifier section 33 that amplifies the intensity of the plural laser beams that are outputted from the distributor section 31 through the phase delay variable device 32, and enlarges and outputs the beam system as the occasion demands, a synthesizer section 34 that includes mirrors which convert the spatial arrangement and the angle of the plural laser beams so that the plural laser beams corresponding to outputs of the amplifier section 33 are coherently coupled with each other, laser beam splitting means 35 that includes a beam splitter which splits and extracts the plural laser beams outputted from the synthesizer section 34 for measurement, and a laser phase control device that outputs a feedback control signal to the phase delay variable device 32 and controls the phase difference of the plural laser beams, so as to arbitrarily control the spatial intensity distribution of the laser beams that are subjected to coherent optical coupling with each other by means of the synthesizer section 34.

The laser phase control device includes a laser phase difference detecting device 36, a laser optical path length difference detecting device 37, an optical path length/phase difference control device 38, and a phase delay variable device 32.

The laser phase control device outputs the feedback control signal to the phase delay variable device 32 on the basis of the detection of the phase difference and the optical path length difference between the plural laser beams which are subjected to coherent optical coupling with each other through the phase delay variable device 32 that changes the relative phase difference of the plural laser beams to control the phase difference and the optical path length difference between the plural laser beams. The laser optical path length difference detecting device 37 according to any one of the first to fourth embodiments is applied to this embodiment.

In this example, the laser phase difference detecting device 36 detects the phase difference between the plural laser beams, and the system of detecting the phase difference is realized by a Mach-Zehnder type interferometer that is disclosed in, for example, Patent Document 1. Also, the laser optical path length difference detecting device 37 is a laser optical path length detecting device shown in any one of the first to fourth embodiments. The phase delay variable device 32 changes the relative phase difference of the plural laser beams to be subjected to coherent optical coupling with each other. Any method of changing the relative phase difference can be applied, and the change in the relative phase difference is realized by changing the positions of the mirrors indicated by oblique lines in FIG. 7. In addition, the optical path length/phase difference control device 38 outputs the feedback control signal to the phase delay variable device 32 so as to reduce the optical path length difference that is detected by the laser optical path length difference detecting device 37, and calculates a difference between the relative phase difference of the plural laser beams that are detected by the laser phase difference detecting device 36 and the relative phase difference that is stored according to an intended purpose in advance. The optical path length/phase difference control device 38 further calculates a relative phase difference correction amount so that the relative phase difference of the plural laser beams becomes a target value according to the calculated difference, and outputs the feedback control signal to the phase delay variable device 32.

Therefore, since the coherent optical coupling device according to the fifth embodiment shown in FIG. 7 is structured as described above, the laser beam to be subjected to coherent optical coupling with each other is a pulse laser, and therefore even in the case where the relative optical path length difference needs to be adjusted with high precision, desired phase control can be conducted.

Also, according to the laser phase control device of the fifth embodiment, the same configuration as any one of the laser optical path length difference detecting devices described in the first to fifth embodiments is applied to the laser optical path length difference detecting device 37, which produces the same effects as those in the laser optical path length difference detecting devices described in the first to fifth embodiments.

The invention claimed is:
1. A laser optical path length difference detecting device for detecting an optical path length difference between propagation paths of a first laser beam and a second laser beam which are mutually coherent when the first and second laser beams are propagated through two arbitrary optical paths of a plurality of laser beam optical paths, the laser optical path length difference detecting device comprising:
optical path length difference variable means for changing an optical path length difference between the first laser beam and the second laser beam;

wavefront inclination generating means for inclining a wavefront of at least one of the first laser beam and the second laser beam; and optical intensity distribution detecting means for detecting an interference light intensity distribution of the first laser beam and the second laser beam which have passed through the wavefront inclination generating means.

2. The laser optical path length difference detecting device according to claim 1, wherein the wavefront inclination generating means comprises a wedge prism.

3. The laser optical path length difference detecting device according to claim 1, further comprising a spatial filter that removes a wavefront distortion of the first laser beam and the second laser beam.

4. The laser optical path length difference detecting device according to claim 1, wherein the wavefront inclination generating means has a first pin hole and a second pin hole through which the first laser beam and the second laser beam pass, respectively.

5. The laser optical path length difference detecting device according to claim 4, further comprising a lens for condensing the first laser beam and the second laser beam onto the first pin hole and the second pin hole, respectively.

6. The laser optical path length difference detecting device according to claim 1, wherein the wavefront inclination generating means has a first slit and a second slit through which the first laser beam and the second laser beam pass, respectively.

7. The laser optical path length difference detecting device according to claim 6, further comprising a lens for condensing the first laser beam and the second laser beam onto the first slit and the second slit, respectively.

8. A laser phase control device for outputting a feedback control signal to a phase delay variable section on the basis of the detection of a phase difference and an optical path length difference between a plurality of laser beams which are subjected to coherent optical coupling with each other through the phase delay variable section for changing the relative phase difference of the plurality of laser beams to control the phase difference and the optical path length difference between the plurality of laser beams, the laser phase control device comprising:

the laser optical path length difference detecting device according to claim 1 to detect the optical path length difference between the plurality of laser beams.

9. A coherent optical coupling device, comprising:

a laser source for outputting a laser beam;

a distributor section for distributing the laser beam that is outputted from the laser source to a plurality of laser beams;

a phase delay variable section for controlling a relative phase of the laser beams that are distributed by the distributor section;

an amplifier section for amplifying intensities of the plurality of laser beams that pass through the phase delay variable section;

a synthesizer section for performing coherent optical coupling on the plurality of laser beams that are amplified by the amplifier section; and a laser phase control device for outputting a feedback control signal to the phase delay variable section to control a phase difference between the plurality of laser beams, to arbitrarily control a spatial intensity distribution of the laser beams that are subjected to coherent optical coupling by the synthesizer section, wherein the laser phase control device comprises the laser phase control device according to claim 8, and outputs the feedback control signal to the phase delay variable section on the basis of the detection of the phase difference and the optical path length difference between the plurality of laser beams which are subjected to coherent optical coupling with each other by the synthesizer section to control the phase difference between the plurality of laser beams.

* * * * *